United States Patent
Atkinson

(10) Patent No.: US 10,937,445 B2
(45) Date of Patent: Mar. 2, 2021

(54) PROVIDING ALERTS FOR EVENTS

(71) Applicant: Hewlett-Packard Development Company, L.P., Spring, TX (US)

(72) Inventor: Lee Atkinson, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/603,257

(22) PCT Filed: Apr. 17, 2017

(86) PCT No.: PCT/US2017/027877
§ 371 (c)(1),
(2) Date: Oct. 7, 2019

(87) PCT Pub. No.: WO2018/194541
PCT Pub. Date: Oct. 25, 2018

(65) Prior Publication Data
US 2020/0043513 A1 Feb. 6, 2020

(51) Int. Cl.
| | | |
|---|---|---|
| *G10L 25/51* | (2013.01) | |
| *G08B 3/10* | (2006.01) | |
| *G08B 7/06* | (2006.01) | |
| *G10L 15/08* | (2006.01) | |
| *G10L 15/22* | (2006.01) | |
| *H04N 5/232* | (2006.01) | |

(52) U.S. Cl.
CPC .......... *G10L 25/51* (2013.01); *G08B 3/10* (2013.01); *G08B 7/06* (2013.01); *G10L 15/08* (2013.01); *G10L 15/22* (2013.01); *H04N 5/23245* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 8,780,014 B2* | 7/2014 | Border | G02B 27/01 |
| | | | 345/8 |
| 9,398,367 B1 | 7/2016 | Scott et al. | |
| 2008/0243504 A1 | 10/2008 | Poi | |
| 2014/0064511 A1 | 3/2014 | Desai | |
| 2015/0222977 A1* | 8/2015 | Angel, Jr. | H04R 1/105 |
| | | | 381/74 |

(Continued)

OTHER PUBLICATIONS

Here One™ Smart Wireless Earbuds.

(Continued)

*Primary Examiner* — Heather R Jones
(74) *Attorney, Agent, or Firm* — Fabian VanCott

(57) ABSTRACT

A device for providing an alert for an event, the device includes a microphone to receive ambient sounds external to the device and a processor and memory to analyze the ambient sounds received by the microphone wherein, based on a priority level assigned to a type of audiovisual media being played on the device, the processor selectively activates a pass thru mode of the device in response to determining that one of the ambient sounds matches a trigger sound, the pass thru mode providing the alert for the event by interrupting the audiovisual media being played on the device such that the ambient sounds can be heard by the user.

18 Claims, 5 Drawing Sheets

(56) References Cited

U.S. PATENT DOCUMENTS

2016/0192073 A1* 6/2016 Poornachandran ..... G10L 25/51
381/26

OTHER PUBLICATIONS

Koss Cs100 Speech Recognition Computer Headset, 2006, Amazon.com.

Hall Parker, Sony's newest headphones are completely 'ears free', Mar. 16, 2016.

* cited by examiner

| Assigned Priority Levels 114 |||
|---|---|---|
| Audiovisual Media 402 | Priority Level 404 | Active Pass Thru Mode 406 |
| Music 402-1 | Low 404-1 | Yes 406-1 |
| Phone Call 402-2 | High 404-2 | No 406-2 |
| Movie 402-3 | Medium 404-3 | Depends 406-3 |
| Video Game 402-4 | Low 404-4 | Yes 406-4 |

PROVIDING ALERTS FOR EVENTS

BACKGROUND

A device, such as a smart phone, a tablet, an MP3 player, a computer, a head-mounted display (HMD), among other devices is used to immerse a user in audiovisual media. To immerse the user in audiovisual media, a device includes a display and connects to other devices such as headphones. The display is an output of the device that presents information to the user in a visual form. Headphones are designed to be worn on or around the head of the user and over the user's ears. The headphones present information to the user in an audio form. The user manually manipulates controls on the device to control the audiovisual media outputted to the display and the headphones.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1A:
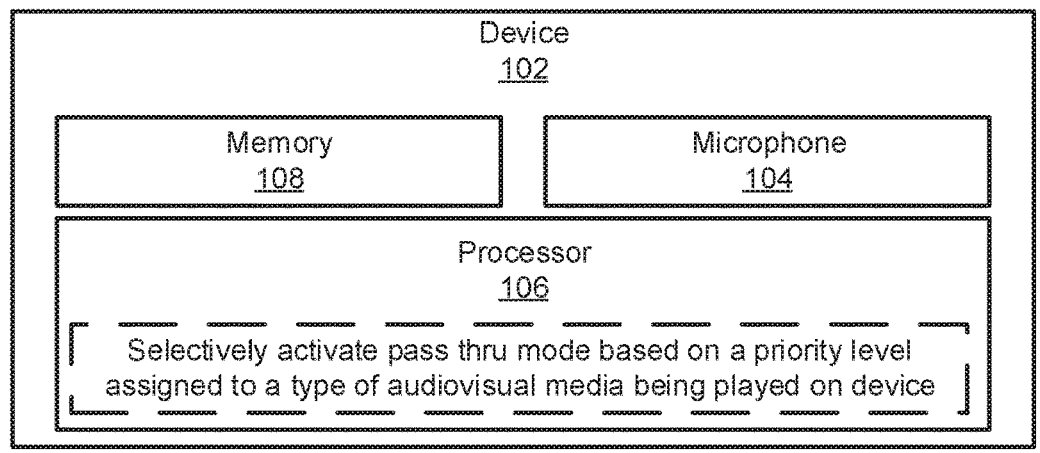
FIG. 1A is a diagram of a system for providing an alert for an event, according to one example of principles described herein.

As noted above, to immerse the user in audiovisual media, a device includes a display and connects to another device such as headphones. Headphones are often designed to block out ambient sounds. For example, some headphones have large pads that surround the outer ear of the user. This allows the headphones to fully seal against the ears of the user to attenuate ambient sounds. Active noise-cancelling headphones use a microphone, amplifier, and speaker to pick up, amplify, and play ambient sounds in phase-reversed form. This cancels out unwanted noise from the user's surroundings without affecting the audiovisual media playing on the device. Further, the display of the device can be attached to a head-mounted display (HMD). The HMD is a device that is worn on the user's head such that the display is in front of the user's eyes and visually blocks out the user's surroundings. The combination of the display and headphones allows the user to immerse themselves in the audiovisual played on the electronic device.

Because headphones and HMD are designed to block out ambient sounds and the user's surrounding, the user can be oblivious to a person trying to get their attention. This leads to the person verbally shouting to get the user's attention or the person physically touching the user to get the user's attention. This can lead to frustration since the user may be ignoring that person simply because the user is unaware of the person trying to get their attention. Further, the user needs to physically remove the headphones and/or HMD to have a conversation with people in the surrounding area.

Consequently, the present specification describes, for example, a device for providing an alert for an event, the device includes a microphone to receive ambient sounds external to the device and a processor and memory to analyze the ambient sounds received by the microphone wherein, based on a priority level assigned to a type of audiovisual media being played on the device, the processor selectively activates a pass thru mode of the device in response to determining that one of the ambient sounds matches a trigger sound, the pass thru mode providing the alert for the event by interrupting the audiovisual media being played on the device such that the ambient sounds can be heard by a user.

In another example, the present specification describes a method for providing an alert for an event by receiving, via a microphone of a device, ambient sounds external to the device, analyzing, via a processor and memory, the ambient sounds received by the microphone and with the processor selectively activating, based on a priority level assigned to a type of audiovisual media being played on the device, a pass thru mode of the device in response to determining that one of the ambient sounds matches a trigger sound wherein the pass thru mode provides the alert for the event by interrupting the audiovisual media being played on the device, amplifying, via headphones connected to the device, the ambient sounds such that the ambient sounds can be heard by a user and selectively activating a camera of the device based on the audiovisual media being played on the device such that a display of the device displays an environment to the user.

In another example, the present specification describes a computer program product for providing an alert for an event, the computer program product includes a non-transitory computer readable storage medium having computer readable program code embodied therewith, the computer readable program code includes computer readable program code to, when executed by a processor, receive, via a microphone, ambient sounds external to a device, computer readable program code to, when executed by a processor, analyze, via a processor and memory, the ambient sounds received by the microphone and computer readable program code to, when executed by a processor, determine a priority level assigned to a type of audiovisual media being played on the device wherein the processor, in response to determining that one of the ambient sounds matches a trigger sound, replays recorded audio of the ambient sounds matching the trigger sound after interrupting the audiovisual media being played on the device.

In the present specification and in the appended claims, the term "trigger sound" means an indication to signal a processor to selectively activate a pass thru mode on a device. The trigger sound can be a word, a specific sound such as a fire alarm, a repetition of any type of sound, among others.

In the present specification and in the appended claims, the term "match" means a resemblance between an ambient sound and a trigger sound. For example, when an ambient sound resembles a trigger sound, a match is determined.

In the present specification and in the appended claims, the term "priority level" means an order of importance assigned to a type of audiovisual media. The priority level may be symbolic such as high, medium or low. The priority level may be a range such as 0 to 10 where 0 signifies a low priority level and 10 signifies a high priority level.

In the present specification and in the appended claims, the term "pass thru mode" means a state of a device that allows a user to hear ambient sounds or see their surroundings. In an example, the pass thru mode silences the audiovisual media being played on the device such that the user can hear the ambient sounds. In another example, the pass thru mode replaces the audiovisual media being played on the device with a replay of the ambient sounds received by the microphone that activated the pass thru mode. In another example, after the pass thru mode is activated ongoing ambient sounds are amplified by the device to the user.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1B:
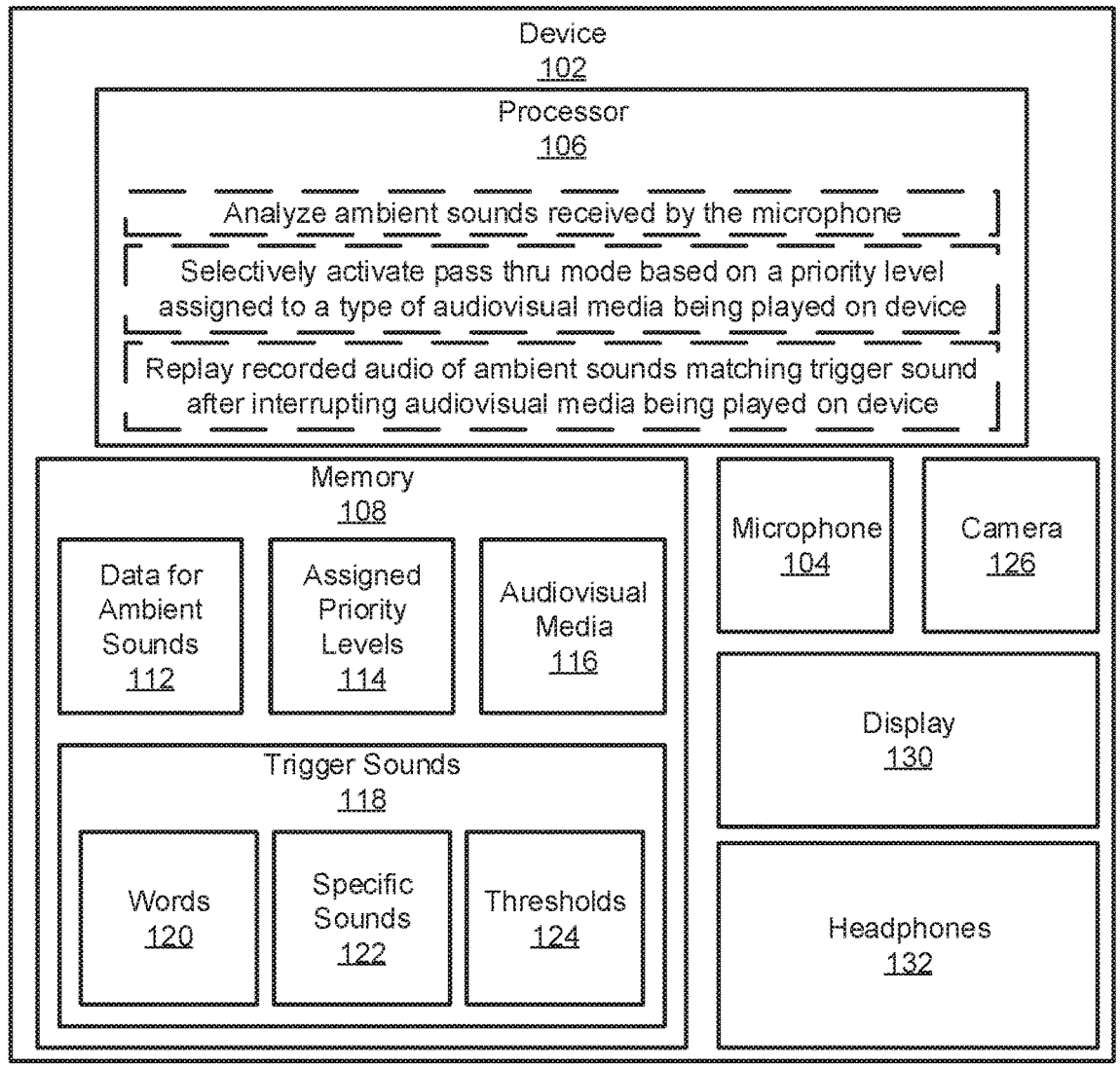
FIG. 1B is a diagram of a system for providing an alert for an event, according to one example of principles described herein.

Referring now to the figures. FIGS. 1A and 1B both illustrate a device (102). In the example of FIG. 1A, the device is headphones. The headphones include a pair of transducers to convert electronic signals received from another device into a sound wave such that the user can hear the audio media. In the example of FIG. 1B, the device is a HMD. The HMD is a device that is worn on the user's head such that the display is in front of the user's eyes and visually blocks out the users surroundings. The HMD includes headphones. As a result, the device (102) of FIG. 1A allows the user to immerse themselves in audio media. The device (102) of FIG. 1B allows the user to immerse themselves in audiovisual media.

FIG. 1A is a diagram of a system for providing an alert for an event, according to one example of principles described herein. As will be described below, the device (102) includes a microphone (104), a processor (106) and memory (108).

As illustrated in FIG. 1A, the device (102) includes a microphone (104). The microphone (104) receives ambient sounds external to the device (102).

The device (102) includes a processor (106) and memory (108). The processor (106) and the memory (108) analyze the ambient sounds received by the microphone (104).

In an example, based on a priority level assigned to a type of audiovisual media being played on the device (102), the processor (106) selectively activates a pass thru mode of the device (102) in response to determining that one of the ambient sounds matches a trigger sound, the pass thru mode providing an alert for an event by interrupting the audiovisual media being played on the device (102) such that the ambient sounds can be heard by a user.

FIG. 1B is a diagram of a system for providing an alert for an event, according to one example of principles described herein. As will be described below, the device (102) includes a microphone (104), a processor (106) and memory (108), a camera (126), a display (130) and headphones (132).

As illustrated in FIG. 1B, the device (102) includes a microphone (104). In some examples, the microphone (104) is located on the device (102). In other examples, the microphone (104) is located external to the device (102). For example, if the device (102) connects to other devices, such as headphones (132), the microphone (104) is located on the headphones (132).

The microphone (104) is a transducer that converts sound into an electrical signal. For example, the microphone (104) receives ambient sounds external to the device (102) and converts the ambient sounds into electrical signals. The ambient sounds include conversations between a number of people, background noise, among other ambient sounds. The ambient sounds depend on the user's surroundings. For example, if a user is on an airplane, the ambient sounds include conversations, a sound associated with a seatbelt warning sign, the sound of the airplane's engines, among other ambient sounds. If the user is walking down the street, the ambient sounds include conversations, the sound of the cars passing by, among other ambient sounds.

The device (102) includes a processor (106) and memory (108). The processor (106) and the memory (108) are communicatively coupled to the microphone (104). This allows the processor (106) and the memory (108) to analyze the ambient sounds received by the microphone (104). For example, the microphone (104) is communicatively coupled to the processor (106) such that the processor (106) receives electrical signal from the microphone (104). Once the processor (106) receives electrical signal from the microphone (104), the processor (106) and the memory (108) analyze the ambient sounds received by the microphone (104).

In an example, the memory (108) stores the ambient sounds received by the microphone (104) as data for ambient sounds (112). The data for ambient sounds (112) are the electrical signals that the processor (106) receives from the microphone (104). This allows the memory (104) to store the ambient sounds, as electrical signals for a duration of time. Since the ambient sounds are stored for a duration of time, this allows the processor (106) analyze the ambient sounds to identify at least two portions of the ambient sounds that are repetitive. As will be described below, ambient sounds that are repetitive selectively activate the pass thru mode of the device (102).

The memory (108) further stores assigned priority levels (114). The assigned priority levels (114) signify if the processor (106) of the device (102) can activate the pass thru mode. A priority level may be symbolic such as high, medium or low. A priority level assigned to a type of audiovisual media that is high signifies that this type of audiovisual media should not be interrupted when an ambient sound matches a trigger sound. A priority level assigned to a type of audiovisual media that is medium signifies that this type of audiovisual media may nor may not be interrupted when an ambient sound matches a trigger sound medium. A priority level assigned to a type of audiovisual media that is low signifies that this type of audiovisual media should be interrupted when an ambient sound matches a trigger sound. The priority level may be a range such as 0 to 10 where 0 signifies a low priority level and 10 signifies a high priority level. As a result, the processor (106) selectively activates a pass thru mode of the device (102) based on a priority level assigned to a type of audiovisual media (116) being played on the device (102). More information about the assigned priority levels (114) will be described in FIG. 3.

The memory (108) further stores audiovisual media (116). As will be described in FIG. 3, the audiovisual media (116) may be music, a phone call, a movie, a video game, or other audiovisual media. In some examples, the audiovisual media (116) is stored internal to the device (102). In other examples, the audiovisual media (116) is downloaded or streamed.

The memory (108) stores trigger sounds (118). Trigger sounds (118) are an indication to selectively activate a pass thru mode on the device (102). A trigger sound can be a word, a specific sound such as a fire alarm, a repetition of any type of sound, among others.

As mentioned above, trigger sounds (118) can be words (120). The words (120) are an indication to selectively activate the pass thru mode on the device (102). The words (120) can be predetermined and stored in memory (108). Such words (120) include the name of the user such as "Lee". In other examples, the words (120) include such words as to alert a user to an event. These words include "excuse me", "careful", "sir", "madam" "hey", "hello" among other words. If the microphone (104) receives an ambient sound and that ambient sound is determined to be any of these words (120), this is an indication to selectively activate the pass thru mode on the device (102).

The trigger sounds (118) can be specific sounds (122). These specific sounds (122) can be predetermined and stored in memory (108). The specific sounds (122) include emergency vehicle sounds, smoke detector sounds, among other specific sounds. If the microphone (104) receives an ambient sound and that ambient sound is determined to be any of these specific sounds (122), this is an indication to selectively activate the pass thru mode on the device (102).

In other examples, the specific sounds (122) can be associated with a number of people such that the device (102) can recognize specific people. This allows the device (102) to distinguish between a stranger and a person that the user knows such as a sibling. If the microphone (104) receives an ambient sound and that ambient sound is determined to be from a stranger, this can be an indication to not activate the pass thru mode on the device (102). If the microphone (104) receives an ambient sound and that ambient sound is determined to be from a sibling, this is an indication to selectively activate the pass thru mode on the device (102). In continuing with this example of recognize specific people, the device (102) can recognize the user's voice. For example, if the microphone (104) receives an ambient sound and that ambient sound is determined to be the user's voice, this can be an indication to activate the pass thru mode on the device (102). In some scenarios, it is desirable to activate the pass thru mode on the device (102) only based on specific words uttered by the user. For example, some user's sing along to music. In this example, it may be undesirable to activate the pass thru mode based on the user's voice because the user is singing along to the music. As a result, a specific word uttered by the user can be used to activate the pass thru mode while other words uttered by the user do not activate the pass thru mode.

The trigger sounds (118) can be thresholds (124). Thresholds (124) include a frequency of ambient sounds, a decibel level of ambient sounds, an ascending threshold and among other thresholds. For example, a threshold is 90 decibels. If the microphone (104) receives an ambient sound that is above 90 decibels, this is an indication to activate the pass thru mode on the device (102). However, if the microphone (104) receives an ambient sound that is below 90 decibels, this is an indication not to activate the pass thru mode on the device (102).

In another example, the thresholds (124) can be an ascending threshold. For example, if the microphone (104) receives an ambient sound that is ascending (i.e. getting louder and louder), this is an indication to activate the pass thru mode on the device (102).

The device (102) includes a camera (126). The camera (126) is used to capture the user's environment when the pass thru mode is activated. Once the pass thru mode is activated, a display (130) displays the visual information (i.e. the user's environment) captured by the camera (126) to the user. However, when the pass thru mode is not activated, the display (130) displays the visual information of the audiovisual media (116) being played on the device (102).

As mentioned above, the device (102) includes the processor (106). The processor (106) selectively activates the pass thru mode of the device (102) in response to determining that one of the ambient sounds matches a trigger sound as described above. The pass thru mode providing an alert for an event by interrupting the audiovisual media (116) being played on the device (102) such that the ambient sounds can be heard by the user.

The pass thru mode is selectively activated by determining if a portion of the ambient sounds match a trigger sound. When the portion of the ambient sounds match the trigger sound, the processor (106) determines the type of the audiovisual media being played on the device (102). Once the processor (106) determines the type of the audiovisual media being played on the device (102), the processor (106) determines the priority level assigned to the type of audiovisual media being played on the device (102). As will be described in FIG. 3 based on the priority level assigned to the type of the audiovisual media being played on the device (102), the processor selectively activating the pass thru mode.

In an example, the pass thru mode silences the audiovisual media (116) being played on the device (102) such that the user can hear the ambient sounds. This includes pausing the audiovisual media (116) being played on the device (102) or turning off the audiovisual media (116) being played on the device (102).

In another example, the pass thru mode replaces the audiovisual media (116) being played on the device (102) with a replay of the ambient sounds received by the microphone (104) that activated the pass thru mode. For example, if the ambient sounds that triggered the pass thru mode was "excuse me" the pass thru mode replaces the audiovisual media (116) being played on the device (102) with "excuse me." Once that ambient sound has been played, the pass thru mode is deactivated such that the audiovisual media (116) resumes being played on the device (102). In another example, once that ambient sound has been played, the pass thru mode is deactivated until the user manually resume playing the audiovisual media (116) resumes on the device (102).

In another example, after the pass thru mode is activated ongoing ambient sounds are amplified by the device (102) to the user. In this example, the microphone (104) receives the ongoing ambient sounds and the headphones (132) of the device (02) are used to amplify the ongoing ambient sounds.

In some examples, the audiovisual media (116) is utilizing the display (130) such that the user cannot see their surroundings. As a result, the pass thru mode selectively activates the camera (126) of the device (102) based on the audiovisual media (116) being played on the device (102) such that the display (130) of the device (102) displays an environment to the user.

A number of examples will be described with reference to FIG. 1B. In a first example, the user is in a phone call. As a result, the audiovisual media (116) is the phone call. During the phone call, the microphone (104) receives ambient sounds external to the device (102). One of the ambient sounds is "excuse me." The processor (106) and memory (108) analyze the ambient sounds received by the microphone (104). The processor (106) determines that one of the ambient sounds matches a trigger sound (i.e. "excuse me"). The processor (106) determines the priority level assigned a phone call as high. As a result, the processor (106) does not activate the pass thru mode of the device (102).

In a second example, the user is in a listening to music. As a result, the audiovisual media (116) is the music. While listening to the music, the microphone (104) receives ambient sounds external to the device (102). The ambient sounds are the repetition of "entschuldigung." The processor (106) and memory (108) analyze the ambient sounds received by the microphone (104) as a repetition of a sound. The processor (106) determines that one of the ambient sounds matches a trigger sound (i.e. a repetition of any sound). The processor (106) determines the priority level assigned music is low. As a result, the processor (106) activates the pass thru mode of the device (102). In this example, the pass thru mode interrupts the audiovisual media (116) being played on the device (102) and amplifies ongoing ambient sounds via the headphone (132) of the device (102). As a result, the user does not need to remove the device (102) to hear the ambient sounds.

In a third example, the user is in is playing a video game using a HMD. As a result, the audiovisual media (116) is the video game. While playing the video game, the microphone (104) receives ambient sounds external to the device (102). The ambient sounds are a fire alarm. The processor (106) and memory (108) analyze the ambient sounds received by the microphone (104) as specific sounds (122). The processor (106) determines that one of the ambient sounds matches a trigger sound (i.e. a fire alarm). The processor (106) determines the priority level assigned a video game is medium. As a result, the processor (106) activates the pass thru mode of the device (102) because the ambient sound is a fire alarm. In this example, the pass thru mode interrupts the audiovisual media (116) being played on the device (102), amplifies ongoing ambient sounds via the headphone (132) of the device (102) and activates the camera (126). As a result, the user does not need to remove the device (102) to hear the ambient sounds or see their surroundings.

While specific examples have been given as to when and why the processor (106) activates the pass thru mode, it should be understood that other examples not given could activate the pass thru mode. Further, a user can modify setting of the device such that the processor (106) activates the pass thru mode based on these settings. In some examples, the device (102) includes a button. The button allows the user to manually activate the pass thru mode.

Figures 2, 3:
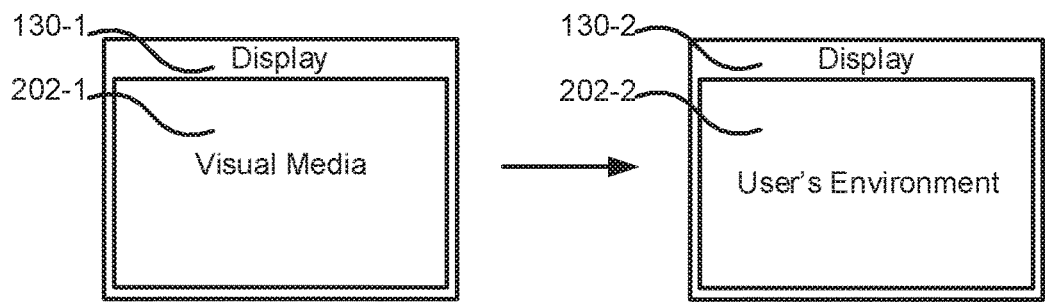
FIG. 2 is a diagram of a pass thru mode for a display, according to one example of principles described herein.
FIG. 3 is a diagram of assigned priority levels for audiovisual media, according to one example of principles described herein.

FIG. 2 is a diagram of a pass thru mode for a display, according to one example of principles described herein. As mentioned above, the audiovisual media (202-1) may be utilizing a display (130) such that the user cannot see surrounding.

In an example, the pass thru mode selectively activates a camera (126) of the device (102) based on the audiovisual media (202-1) being played on the device (102) such that a display (130) of the device displays an environment to the user. For example, a display (130-1) is displaying visual media (202-1). In response to determining that one of the ambient sounds matches a trigger sound, the pass thru mode provides an alert for an event by interrupting the audiovisual media being played on the device (102) such that the ambient sounds can be heard by the user. In this example, the pass thru mode selectively activates the camera (126) of the device (102) such that the display (130-2) of the device (102) displays an environment (202-2) to the user. In another example, the display (130) or portions of the display (130) can selectively switch between transparent and opaque. For example, the display (130) is used for augmented reality by selectively obscuring a transparent view of the user's surroundings with a rendered image. In this example, the display (130-1) includes the transparent view of the user's surroundings and the rendered image is the audiovisual media (202-1). When the pass thru mode is activated, the rendered image is no longer seen by the user on the display (130-2) such that a portion of the display (130-2) where the rendered image was located is no longer obscured by the rendered image. This allows the entire display (130-2) to displays an environment (202-2) to the user due to the transparency of the display (130-2).

FIG. 3 is a diagram of assigned priority levels for audiovisual media, according to one example of principles described herein. As will be described below, a type of audiovisual media (402) is assigned a priority level (404).

As illustrated, the assigned priority levels (114) include a number of types of audiovisual media (402). Such audiovisual media (402) include music (402-1), a phone call (402-2), a movie (402-3) and a video game (402-4). Each type of audiovisual media (402) is assigned a priority level (404). For example, music (402-1) is assigned a low (404-1) priority level. The phone call (402-2) is assigned a high (404-2) priority level. The movie (402-3) is assigned a medium (404-3) priority level. The video game (402-4) is assigned a low (404-1) priority level.

As mentioned above, the pass thru mode is selectively activated based on the audiovisual media playing on the device (102). For example, if music (402-1) is the audiovisual media playing on the device (102) when the pass thru mode is to be activated by the processor (106), the pass thru mode is activated (yes 406-1) because the music (402-1) is assigned a low (404-1) priority level. If the phone call (402-2) is the audiovisual media playing on the device (102) when the pass thru mode is to be activated by the processor (106), the pass thru mode is not activated (no 406-2) because the phone call (402-2) is assigned a high (404-2) priority level. If the movie (402-3) is the audiovisual media playing on the device (102) when the pass thru mode is to be activated by the processor (106), the pass thru mode may or may not be activated (depends 406-3) because the movie (402-3) is assigned a medium (404-3) priority level. A priority level that is medium depends on the ambient sound received that triggered the pass thru mode. For example, an ambient sound such as "excuse me" may not activate the pass thru mode. However, an ambient sound such as a fire alarm activates the pass thru mode. If the video game (402-4) is the audiovisual media playing on the device (102) when the pass thru mode is to be activated by the processor (106), the pass thru mode is activated (yes 406-4) because the video game (402-4) is assigned a low (404-4) priority level.

Figure 4:
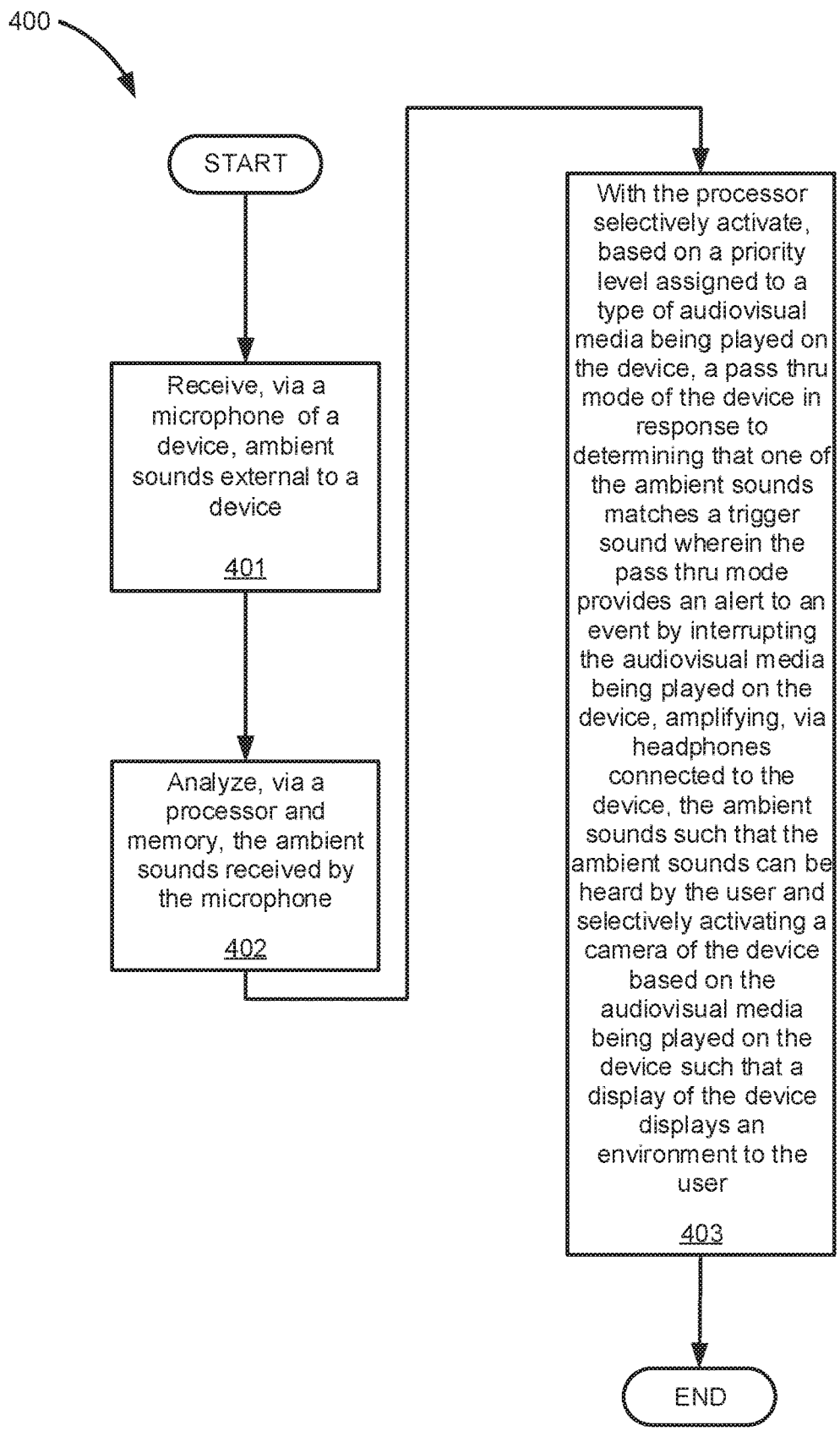
FIG. 4 is a flowchart of a method for providing an alert for an event, according to one example of principles described herein.

FIG. 4 is a flowchart of a method for providing an alert for an event, according to one example of principles described herein. In one example, the method (400) is executed by the system of FIG. 1A, the system of FIG. 1B or the system (600) of FIG. 6. In this example, the method (400) includes receiving (401), via a microphone of a device, ambient sounds external to the device, analyzing (402), via a processor and memory, the ambient sounds received by the microphone and with the processor selectively activating (403), based on a priority level assigned to a type of audiovisual media being played on the device, a pass thru mode of the device in response to determining that one of the ambient sounds matches a trigger sound wherein the pass thru mode provides an alert to the event by interrupting the audiovisual media being played on the device, amplifying, via headphones connected to the device, the ambient sounds such that the ambient sounds can be heard by the user and selectively activating a camera of the device based on the audiovisual media being played on the device such that a display of the device displays an environment to the user.

As mentioned above, the method (400) includes receiving (401), via a microphone of a device, ambient sounds external to the device. In an example, the microphone receives all ambient sounds. In another example, the microphone receives all ambient sounds above a specific threshold or decibel level. For example, if the ambient sounds are below a specific decibel level, the processor and memory may not be able to analyze the ambient sound. The microphone is coupled to electronic circuitry that allows ambient sounds over a specific decibel level to be passed to the processor.

As mentioned above, the method (400) includes analyzing (402), via a processor and memory, the ambient sounds received by the microphone. In an example, the method (400) analyzes, via the processor and the memory, the ambient sounds received by the microphone by converting the ambient sound into data that can be analyzed by the processor and the memory, storing the data associated with the ambient sounds in the memory for a duration of time, analyzing the data for words, repetition, and specific sounds to create an analysis and comparing the analysis against trigger sounds stored in the memory to determine when the ambient sounds match the trigger sounds.

As mentioned above, the method (400) includes with the processor selectively activating (403), based on a priority level assigned to a type of audiovisual media being played on the device, a pass thru mode of the device in response to determining that one of the ambient sounds matches a trigger sound wherein the pass thru mode provides an alert to an event by interrupting the audiovisual media being played on the device, amplifying, via headphones connected to the device, the ambient sounds such that the ambient sounds can be heard by the user and selectively activating a camera of the device based on the audiovisual media being played on the device such that a display of the device displays an environment to the user.

In some examples, the method (400) determines if the camera is to be activated or not. For example, if the user is using a HMD, the method (400) activates the camera when the pass thru mode is activated. As a result, the user does not need to remove the HMD to see the user's surroundings. However, if the user is only using headphones, the method (400) does not activate the camera when the pass thru mode is activated.

Figure 5:
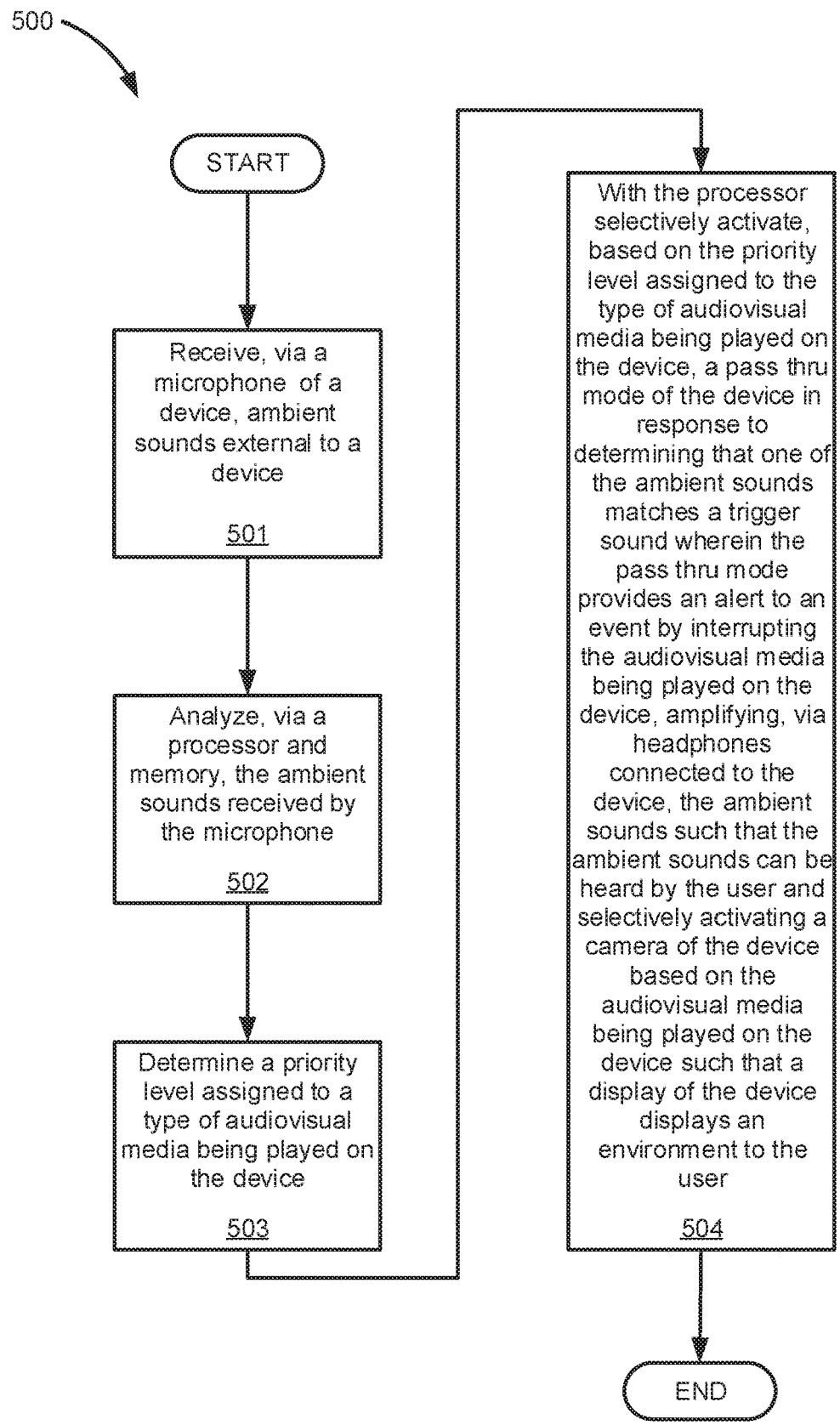
FIG. 5 is a flowchart of a method for providing an alert for an event, according to one example of principles described herein.

FIG. 5 is a flowchart of a method for providing an alert for an event, according to one example of principles described herein. In one example, the method (500) is executed by the system of FIG. 1A, the system of FIG. 1B, or the system (600) of FIG. 6. In this example, the method (500) includes receiving (501), via a microphone of a device, ambient sounds external to a device, analyzing (502), via a processor and memory, the ambient sounds received by the microphone, determining (503) a priority level assigned to a type of audiovisual media being played on the device and with the processor selectively activating (504), based on the priority level assigned to the type of audiovisual media being played on the device, a pass thru mode of the device in response to determining that one of the ambient sounds matches a trigger sound wherein the pass thru mode providing an alert for an event by interrupting the audiovisual media being played on the device, amplifying, via headphones connected to the device, the ambient sounds such that the ambient sounds can be heard by the user and selectively activating a camera of the device based on the audiovisual media being played on the device such that a display of the device displays an environment to the user.

As mentioned above, the method (500) includes determining (503) a priority level assigned to a type of audiovisual media being played on the device. In some examples, the user is able to specify the priority level assigned to all types of audiovisual media. In other example, the priority level assigned to all types of audiovisual media is predetermined.

Figure 6:
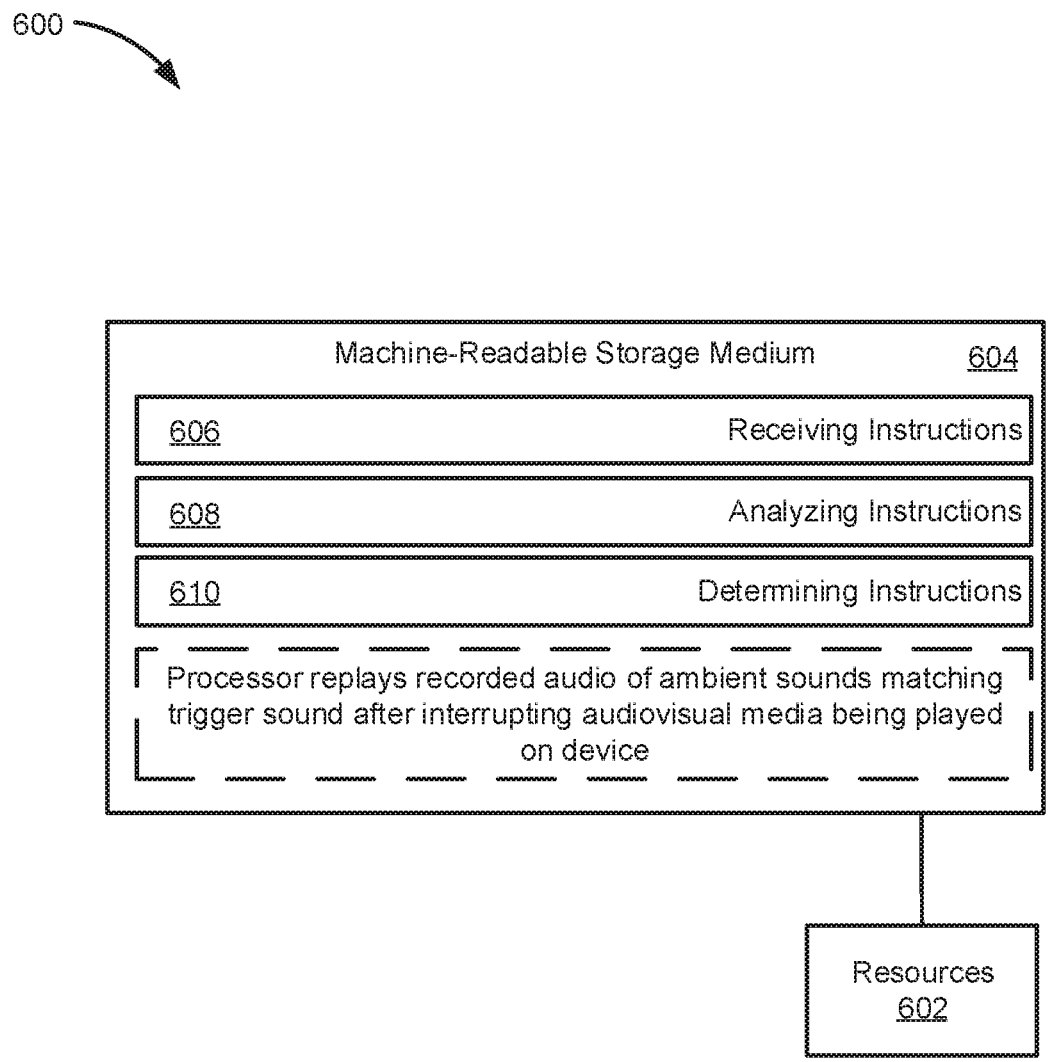
FIG. 6 is a diagram of an alerting system, according to one example of principles described herein.

FIG. 6 is a diagram of an alerting system, according to one example of principles described herein. In this example, the alerting system (600) includes resource(s) (602) that are in communication with a machine-readable storage medium (604). Resource(s) (602) may include one processor. In another example, the resource(s) (602) may further include at least one processor and other resources used to process instructions. The machine-readable storage medium (604) represents generally any memory capable of storing data such as instructions or data structures used by the alerting system (600). The instructions shown stored in the machine-readable storage medium (604) include receiving instructions (606), analyzing instructions (608) and determining instructions (610).

The machine-readable storage medium (604) contains computer readable program code to cause tasks to be executed by the resource(s) (602). The machine-readable storage medium (604) may be tangible and/or physical storage medium. The machine-readable storage medium (604) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The receiving instructions (606) represent instructions that, when executed, cause the resource(s) (602) to receive, via a microphone, ambient sounds external to a device. The analyzing instructions (608) represent instructions that, when executed, cause the resource(s) (602) to analyze, via a processor and memory, the ambient sounds received by the microphone. The determining instructions (610) represent instructions that, when executed, cause the resource(s) (602) to determine a priority level assigned to a type of audiovisual media being played on the device wherein the processor, in response to determining that one of the ambient sounds matches a trigger sound, replays recorded audio of the ambient sounds matching the trigger sound after interrupting the audiovisual media being played on the device.

Further, the machine-readable storage medium (604) may be part of an installation package. In response to installing the installation package, the instructions of the machine-readable storage medium (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (602) and the machine-readable storage medium (604) are located within the same physical component, such as a server, or a network component. The machine-readable storage medium (604) may be part of the physical component's main memory, caches, registers, non-volatile memory, or elsewhere in the physical component's memory hierarchy. Alternatively, the machine-readable storage medium (604) may be in communication with the resource(s) (602) over a network. Further, the data structures, such as the libraries, may be accessed from a remote location over a network connection while the programmed instructions are located locally. Thus, the alerting system (600) may be implemented on a user device, on a server, on a collection of servers, or combinations thereof.

The alerting system (600) of FIG. 6 may be part of a general purpose computer. However, in alternative examples, the alerting system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A device for providing an alert for an event, the device comprising:
   a microphone to receive ambient sounds external to the device; and
   a processor and memory to analyze the ambient sounds received by the microphone;
   wherein, based on a priority level assigned to a type of audiovisual media being played on the device, the processor selectively activates a pass thru mode of the device in response to determining that one of the ambient sounds matches a trigger sound, the pass thru mode providing the alert for the event by interrupting the audiovisual media being played on the device such that the ambient sounds can be heard by the user;
   wherein a phone call has a high priority level such that, if the audiovisual media being played on the device comprises a phone call, the processor will not activate the pass thru mode in response to detecting the trigger sound.

2. The device of claim 1, wherein the memory stores a number of words, the words corresponding to a number of trigger sounds that selectively activate the pass thru mode on the device.

3. The device of claim 1, wherein the memory stores the ambient sounds for a duration of time such that the processor identifies at least two portions of the ambient sounds as the trigger sound to selectively activate the pass thru mode when the at least two portions of the ambient sounds demonstrate repetition of the trigger sound.

4. The device of claim 1, further comprising:
   a display device to be worn covering a user's eyes,
   wherein, when activated, the pass thru mode comprises a camera of the device being activated based on the audiovisual media being played on the display device such that a display of the audiovisual media on the display device is replaced with a video output of the camera to display a live video feed of the user's immediate environment to the user.

5. The device of claim 1, wherein the pass thru mode silences the audiovisual media being played on the device such that the user can hear the ambient sounds.

6. The device of claim 1, wherein the pass thru mode replaces the audiovisual media being played on the device with a replay of the trigger sound received by the microphone that activated the pass thru mode.

7. The device of claim 1, wherein, after the pass thru mode is activated, ongoing ambient sounds are transduced by the microphone and replayed through speakers of the device to the user, the ambient sounds being amplified by the device when replayed through the speakers of the device.

8. The device of claim 1, wherein the pass thru mode is selectively activated by:
   determining if a portion of the ambient sounds match a trigger sound;
   determining the type of the audiovisual media being played on the device;
   determining the priority level assigned to the type of audiovisual media being played on the device; and
   based on the priority level assigned to the type of the audiovisual media being played on the device selectively activating the pass thru mode.

9. The device of claim 1, further comprising:
   a display device worn over the user's eyes, wherein at least a portion of the display device is selectively switchable between transparent and opaque;
   wherein the processor switches at least a portion of the display device to transparent when the pass thru mode is activated.

10. The device of claim 1, wherein, in addition to the priority level assigned to types of audiovisual media, the processor further assigns a priority level to different trigger sounds, wherein a priority level assigned to a detected trigger sound is also used to determine whether the processor selectively activates the pass thru mode.

11. The device of claim 1, wherein the trigger sound is the user's own voice.

12. The device of claim 11, wherein the trigger sound is a specific word uttered by the user.

13. A method for providing an alert for an event for a user who is utilizing a device that comprises a display worn over the user's eyes and speakers located at the user's ears, the method comprising:
   receiving, via a microphone of the device, ambient sounds external to the device;
   analyzing, via a processor and memory, the ambient sounds received by the microphone; and
   with the processor, selectively activating a pass thru mode of the device in response to determining that one of the ambient sounds matches a trigger sound;
   wherein the pass thru mode provides the alert for the event by interrupting audiovisual media being played on the device and by activating a camera of the device such that the display of the device displays an environment to the user as captured by the cameras;
   the method further comprising determining a priority level assigned to the type of audiovisual media being played on the device, wherein the pass thru mode is selectively activated based on the priority level assigned to the type of audiovisual media such that a type of audiovisual media with an assigned priority level above a threshold will not be interrupted in response to the trigger sound.

14. The method of claim 13, wherein analyzing, via the processor and the memory, the ambient sounds received by the microphone comprises:
- converting the ambient sound into data that can be analyzed by the processor and the memory;
- storing the data associated with the ambient sounds in the memory for a duration of time;
- analyzing the data for words, repetition, and specific sounds to create an analysis; and
- comparing the analysis against trigger sounds stored in the memory to determine when the ambient sounds match the trigger sounds.

15. The method of claim 13, wherein the memory stores the ambient sounds for a duration of time such that the processor identifies at least two portions of the ambient sounds as the trigger sound to selectively activate the pass thru mode when the trigger sound has been repeated.

16. A computer program product for providing an alert for an event, the computer program product comprising:
- a non-transitory computer readable storage medium having computer readable program code embodied therewith, the computer readable program code comprising:
- computer readable program code to, when executed by a processor, receive, via a microphone, ambient sounds external to a device; and
- computer readable program code to, when executed by a processor, analyze, via a processor and memory, the ambient sounds received by the microphone;

wherein the processor, in response to determining that one of the ambient sounds matches a trigger sound, amplifies and plays ambient sounds transduced by the microphone with speakers of the device to make a user who is wearing the device aware of and able to hear the ambient sounds in the user's environment; and
computer readable program code to determine a priority level assigned to a type of audiovisual media being played on the device, wherein amplifying and playing the ambient sounds transduced by the microphone is performed selectively based on the priority level assigned to the type of audiovisual media such that a type of audiovisual media with an assigned priority level above a threshold will not be interrupted in response to the trigger sound.

17. The computer program product of claim 16, wherein the memory stores the ambient sounds for a duration of time such that the processor identifies at least two portions of the ambient sounds as the trigger sound to selectively activate the amplifying and playing of the ambient sounds transduced by the microphone.

18. The computer program product of claim 16, wherein, when amplifying and playing the ambient sounds transduced by the microphone, the computer readable code also selectively activates a camera of the device such that a display of the device displays an environment to the user as captured by the camera on the device.

* * * * *